United States Patent [19]

Ohta et al.

[11] Patent Number: 4,798,131
[45] Date of Patent: Jan. 17, 1989

[54] METHOD AND APPARATUS FOR TARTARS SEPARATION

[75] Inventors: Naotake Ohta, Takarzuka; Masahiro Yotsumoto, Ibaraki; Haruo Nishino, Takatsuki; Hiroshi Tanahashi, Osaka; Hajime Kato, Toyonaka; Toshiaki Tazawa, Ibaraki; Hideo Noda; Yuzuru Wakabayashi, both of Amagasaki, all of Japan

[73] Assignees: Suntory Limited, Osaka; Kansai Chemical Engineering Co., Ltd., Amagasaki, both of Japan

[21] Appl. No.: 909,329

[22] Filed: Sep. 19, 1986

[30] Foreign Application Priority Data

Sep. 24, 1985 [JP] Japan .................. 60-208914

[51] Int. Cl.$^4$ .............................. C12F 1/00
[52] U.S. Cl. .................. 99/277.2; 366/307; 422/135; 422/227; 62/544
[58] Field of Search ................ 99/277.2, 277.1; 366/307; 422/245, 135, 137, 227; 62/544, 532; 210/260; 426/330.4, 592, 490, 495

[56] References Cited

U.S. PATENT DOCUMENTS 3,976,430 8/1976 Houston et al.
4,560,565 12/1985 Wucherpfennig et al.

FOREIGN PATENT DOCUMENTS 1619777 12/1970 Fed. Rep. of Germany .
2640384 3/1978 Fed. Rep. of Germany .
3244221 4/1984 Fed. Rep. of Germany .
1519698 4/1968 France .
2156376 4/1973 France .
2281149 3/1976 France .
460834 3/1937 United Kingdom .
1211576 11/1970 United Kingdom .
1405264 9/1975 United Kingdom .
1588273 4/1981 United Kingdom .

OTHER PUBLICATIONS

Industrial and Engineering Chemistry, vol. 53, No. 8, Aug. 1961, pp. 614–615.
Chemical Abstracts, vol. 101, No. 23, Dec. 3, 1984, p. 485, Abstract No. 209021f, Columbus, Ohio, US; N. Gorinova, et al.: "Bitartrate Stabilization of Wine on Stream", & Lozar. Vinar. 1984, 33(5), 16–21.

Primary Examiner—Kenneth M. Schor
Assistant Examiner—Thi Dang
Attorney, Agent, or Firm—Oblon, Fisher, Spivak, McClelland & Maier

[57] ABSTRACT

An externally cooled cylindrical vessel has a draft tube centered in the lower half thereof. A continuous circulation seeded with tartars crystals includes a fast downward flow through the draft tube and a slow upward flow outside the draft tube. The circulation induces crystal growth and the removal of tartars from the liquid. A coning zone is defined in the vessel above the draft tube. The slow upward flow moves toward the calming zone, facilitating classification of the crystalline matter which is reintroduced into the fact downward flow. The liquid product from which the tartars has been removed and which is collected in the upper section of the vessel is tapped off by an overflow port located near the top of the vessel.

12 Claims, 2 Drawing Sheets

● ▲ MEASUREMENT NEAR THE DRAFT TUBE

○ △ MEASUREMENT AT THE OUTLET

METHOD AND APPARATUS FOR TARTARS SEPARATION

FIELD OF THE INVENTION

This invention relates to a method and an apparatus for removing tartar from wine or grape juice in order to prevent tartar precipitation in the bottled product. More particularly, it relates to a technique for separating tartar dissolved in a liquid by crystallizing the tartar with seed crystals. The technique provides chemically stabilized juice and wine products and maintains their commercial value.

BACKGROUND OF THE INVENTION

Bottled wine often has tartar precipitates in the form of crystals on the bottom of the bottle. Such precipitates occur between bottling and consumption. These precipitates make the product unattractive to consumers.

Various methods have been proposed for preventing tartar precipitates. Tartar precipitates have been removed by cooling, cation exchange, anion exchange, reverse osmosis, and electrodialysis. Also, tartar precipitates have been inhibited by the use of additives.

Of the above methods, the cooling methods have been commonly used. The other methods have not been used commercially, since they suffer from various disadvantages.

A cooling method based on the primary nucleation of potassium hydrogentartrate, which is a major component of tartar, is known. However, this method requires the maintenance of supersaturated solutions for a long time to produce natural nucleation. Thus, if cannot serve market demand immediately, and it requires a large initial investment for cooling equipment and storage equipment.

Another cooling method is known which comprises increasing tartar concentration by freezing and thickening wine to accelerate nucleation. However, this method cannot steadily crystallize and remove tartar and requires additional freezing equipment. This still further increases initial equipment costs.

To accelerate natural crystal growth, some cooling methods have been proposed that comprise growing tartar crystals by adding tartar seed crystals to the source liquid of wine, and thereafter separating the tartar crystals. These seeding methods are divided into two categories: A first contact method and a second carrier adhesion method. The first method is disclosed, for example, in West German Patent DE 3244221C1 issued to Westfaria Co. This publication discloses a process in which seed crystals of potassium hydrogentartrate and dipotassium DL-tartrate are added to precipitate and remove calcium ions which inhibit the growth of tartar crystals. In Japanese Examined Patent Publication No. 39157/1982, issued to Henkel and Co., a process is disclosed in which calcium carbonate is employed as the seed crystal material. The second method is disclosed, for example, in Japanese Examined Patent Publication No. 5157/1981, issued to Henkel and Co. This publication discloses a process in which tartar is extracted from wine through the adhesion of the tartar on carriers made of fiber, etc. The carriers carry the tartar crystals to promote the extraction.

Draft tube baffled crystallizers (hereinafter referred to as DTB crystallizers) have been used in general crystallization processes. A typical DTB crystallizer is illustrated in FIG. 3. In FIG. 3, the numeral 1 identifies a DTB crystallizer equipped with a draft tube 2 centered in the lower half of the DTB crystallizer 1. A propeller 3 is mounted at the bottom of the draft tube 2. The propeller 3 is driven by a motor M connected to the propeller 3 via a shaft. An interposed tube 8 surrounds the draft tube 2, and a vessel 9 surrounds the interposed tube 8. Rotation of the propeller 3 forces an upward flow of liquid introduced from an inlet 4 into the draft tube 2, downward flow of the liquid between the interposed tube 8 and the draft tube 2, and upward flow of the liquid toward an outlet 7 between the interposed tube 8 and the vessel 9.

The numeral 5 identifies a classification leg for separation. Crystals grow inside the draft tube 2 and between the draft tube 2 and the interposed tube 8. These two volumes form a crystallization zone. A space 6 between the interposed tube 8 and the vessel 9 forms a fine trap zone F from which fine crystals on the upward flow are discharged through the outlet 7. Crystals which have grown to some extent remain in the crystallization zone and are allowed to grow uniformly and larger. It is to be understood that the feature of the DTB crystallizer resides in that the interposed tube 8, which extends inside the crystallization zone, functions as a baffle, facilitating the separation of fine crystals from grown crystals. A cooling jacket J to which coolant is supplied is provided on the vessel 9.

As stated above, some of the salient disadvantages of the known cooling methods are that they require expensive equipment for cooling, storage, and concentration; that they do not operate steadily; and that they take a long time to accomplish detartarification because they are based on natural nucleation.

The methods based on cation exchange, anion exchange, reverse osmosis, electrodialysis, or inhibitors also suffer from salient disadvantages that prevent their use on an industrial scale. Even in the field of the seeding method (which is pertinent to the present invention), there are problems due to the requirement to add additives to precipitate calcium ions, which inhibit tartar crystallization (as in the above German Patent), due to the requirement for supply carriers to promote contact between seed and liquid.

To solve the above disadvantages, the application of DTB crystallizers was examined. However, conventional DTB crystallizers are not suitable to tartar crystallization of wine or grape juice, since the concept of the draft and the classification for such crystals is different from that of other fields. In addition, conventional DTB crystallizers are expensive due to their complicated structure. Furthermore, the complicated structures make it difficult to clean the inside of the crystallizers in place, which is not favorable from the viewpoint of sanitation.

OBJECT OF THE INVENTION

It is the principal object of the present invention to provide a method and an apparatus for removing tartar in the form of crystals from wine or grape juice in a crystallizer by using seed crystals. This invention eliminates or greatly ameliorates the drawbacks discussed above.

SUMMARY OF THE INVENTION

A principal feature of the present invention resides in the employment of a draft tube having a height which is one-half or less the height of the crystallizer. The draft tube is centered in the inside of the crystallizer. A crystallization section includes a means for circulating source liquid for the tartar crystallization. The crystallizer is designed to provide a downward flow inside the draft tube and an upward flow at a low rate outside the draft tube. A calming section is located above the crystallization section, but it is not greatly influenced by the circulation, so that classification may be effected in the calming section.

According to the present invention, tartar crystallization is promoted concurrently with classification of the crystals owing to the presence of a crystallization section and a calming section in a crystallizer in place of the fines trap of the DTB crystallizer. Thus, it is possible to continuously obtain product from which tartar has been removed.

The present invention provides an apparatus for removing tartar which is simple in structure, low in cost, and the inside of which is easy to clean in place.

According to a preferred embodiment of the present invention, it is possible to crystallize tartar in one hour of residence time of the source liquid in the crystallizer.

DETAILED DESCRIPTION OF THE PRESENTLY PREFERRED EMBODIMENT

Figure 1:
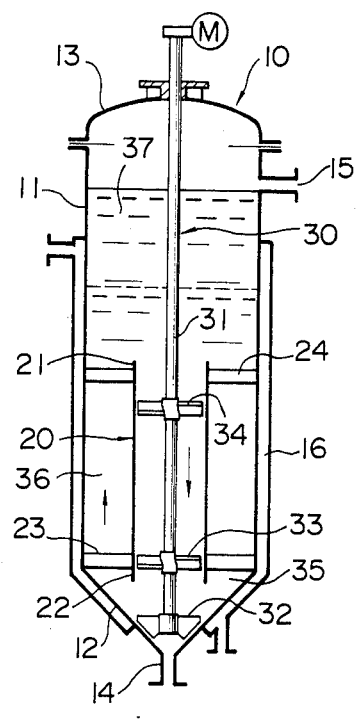
FIG. 1 is a diagrammatic illustration of a preferred embodiment of the crystallizer according to the present invention.

In FIG. 1. the numeral 10 generally indicates a crystallizer according to the present invention. The crystallizer 10 is preferably made of stainless steel. It comprises an upright cylinder 11 which is closed by a conical portion 12 on the bottom and which is attached to a cap portion 13 on the top. The conical portion 12 has an axial inlet 14 at its bottom. The cylinder 11 has a radial outlet 15 on its upper wall. The crystallizer 10 is provided on its exterior wall with a cooling jacket 16 which extends from the upper wall of the cylinder 11 through the conical portion 12. The cooling jacket 16 is supplied with coolant and has a capacity to keep the temperature of the precooled source liquid at 0° to −3° C. The outlet 15 limits the height of the liquid in the crystallizer 10.

The numeral 20 indicates a cylindrical draft tube made of stainless steel. The top and bottom ends 21, 22 of the draft tube 20 are open. The draft tube 20 is supported in the lower half of the crystallizer 10 by supporting members 23 and 24 spaced axially of the draft tube 20. The supporting members 23 and 24 are sized and shaped so that they do not appreciably effect the upward flow of the liquid during use of the crystallizer 10. The draft tube 20 is fixed on the interior wall of the cylinder 11 so as to locate the draft tube 20 coaxially of the cylinder 11. The height of the draft tube 20 is preferably ½ to ¼ the height of the crystallizer 10. The diameter of the draft tube 20 is preferably about ½ to ⅓ the diameter of the cylinder 11.

The numeral 30 indicates a stirrer that comprises a shaft 31 and propellers 32, 33, and 34. The shaft 31 extends along the common axis of the cylinder 11 and the draft tube 20 from the outside of the cap portion 13 to the bottom of the conical portion 12 and is rotatably supported at the top of the cap portion 13. The propeller 32 is arranged at the bottom end of the shaft 31. The propeller 33 is mounted on the bottom portion of the shaft 31 surrounded by the draft tube 20, and the propeller 34 is mounted on the top portion of the shaft 31 surrounded by the draft tube 20. The stirrer 30 is driven via reduction gears by a motor M mounted on the top of the cap portion 13.

Rotation of the propeller 32 makes liquid in a volume 35 bounded by the conical portion 12 and the supporting member 23 flow upwardly through the supporting member 23, an annular zone 36 defined by the upright cylinder 11 and the draft tube 20, and the supporting member 24 into a calming zone 37. Rotation of the propellers 33, 34 makes liquid inside the draft tube 20 flow downwardly into the volume 35. The dimensions of the draft tube 20 are determined so that liquid in the bottom end 22 of the draft tube 20 flows outwardly and joins the upward flow to the annular zone 36. Similarly, some of the liquid flowing upwardly through the annular zone 36 is drawn inwardly over the upper end of the draft tube 20 and is forced back through the draft tube 20 without interacting significantly with the liquid in the calming zone 37. Thus, a circulation of liquid in the crystallizer 10 is facilitated.

The circulation through the annular zone 36 define a crystallization section, while the calming zone 37 is located above the circulation. The two sections in the crystallizer make it easier to separate crystals from liquid.

OPERATION

Hereinafter, the operation and function of the above crystallizer 10 are set forth together with an explanation of the method of removing tartar according to the present invention.

To source liquid of wine or grape juice in the cylinder 11 is added seed crystals of tartar. Although the amount of the seed crystals varies depending on concentration of source liquid and the temperature in the crystallizer 10 cooled by the cooling jacket 16, the following values may serve as a guide: 7–8 grams of seed crystals per lite of source liquid at a temperature of about 0° C. and 3–4 grams per liter of source liquid at a temperature of about −3° C. That is, the approximate range of concentration is 3–8 grams per liter at a temperature range of between −3° C. and 0° C.

The amount of seed is commonly expressed as the concentration of potassium hydrogentartrate in the source liquid. Alternatively, the saturation temperature of the source liquid may be measured, since determination of the concentration is complicated. The preferable amount of seed crystals can be expressed as by 5° C. of the lowering of the saturation temperature.

The stirrer 30 is rotated at 100 rpm or less. The rate of the upward flow between the draft tube 20 and the cylinder 11 is lower than the rate of the downward flow through the draft tube 20 (for example, 0.6 m/hr), since the cross sectional area of the annular zone 36 is larger than the cross sectional area of the draft tube 20.

The calming zone 37 above the draft tube 20 effects classification, since it is little influenced by the circulation around the draft tube 20. The liquid from which tartar crystals have been removed overflows outside via the outlet 15 as fresh source liquid is supplied to the volume 35 from the inlet 14.

In the crystallization section, crystals grow around seed crystals, which act as cores during the residence thereof in the annular zone 36 and in the draft tube 20. The crystals in the volume 35 are conveyed by the upward flow caused by the propeller 32 without precipitating on the bottom of the crystallizer 10. The crystals in the upward flow join the downward flow into the draft tube 20 below the calming zone 37 because of the tendency of the crystals to sink downwardly in the liquid. During the circulation, the crystals grow uniformly.

Figure 3:
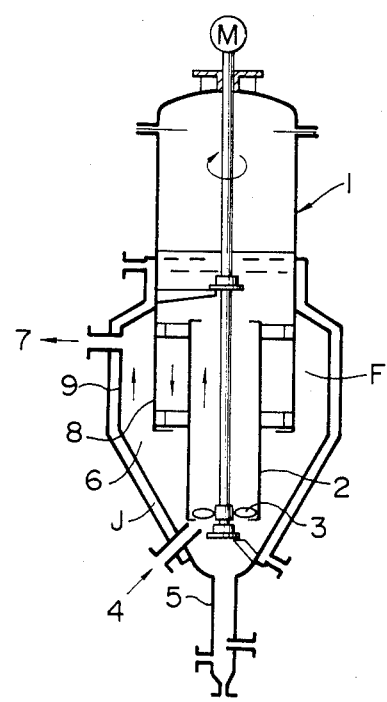
FIG. 3 is a diagrammatic illustration of a conventional DTB crystallizer.

The circulation occurs only in the vicinity of the draft tube 20 even when the downward force caused by the propellers 33 and 34 is varied, and the circulation does not significantly disturb the calming zone 37. There are fine crystals as well as enlarged crystals in the circulation along the inside and the outside of the draft tube 20 at a stable high suspension density, while fine crystals in the calming zone 37, if any, tend to sink and join the circulation. In other words, the calming zone 37 has a function similar to the fines trap F of the typical crystallizer of FIG. 3. However, while the DTB crystallizer of FIG. 3 recovers fine crystals via the fines trap F, in the subject crystallizer, only product from which tartar crystals have been satisfactorily removed overflows, since the flow rate in the calming zone 37 is considerably lower than the flow rate in the fines trap of the typical DTB crystallizer of FIG. 3. Crystals remaining in the circulation may be seed crystals for fresh source liquid and may be discharged from the crystallizer if the amount thereof becomes excessive.

EXAMPLE

Figure 2:
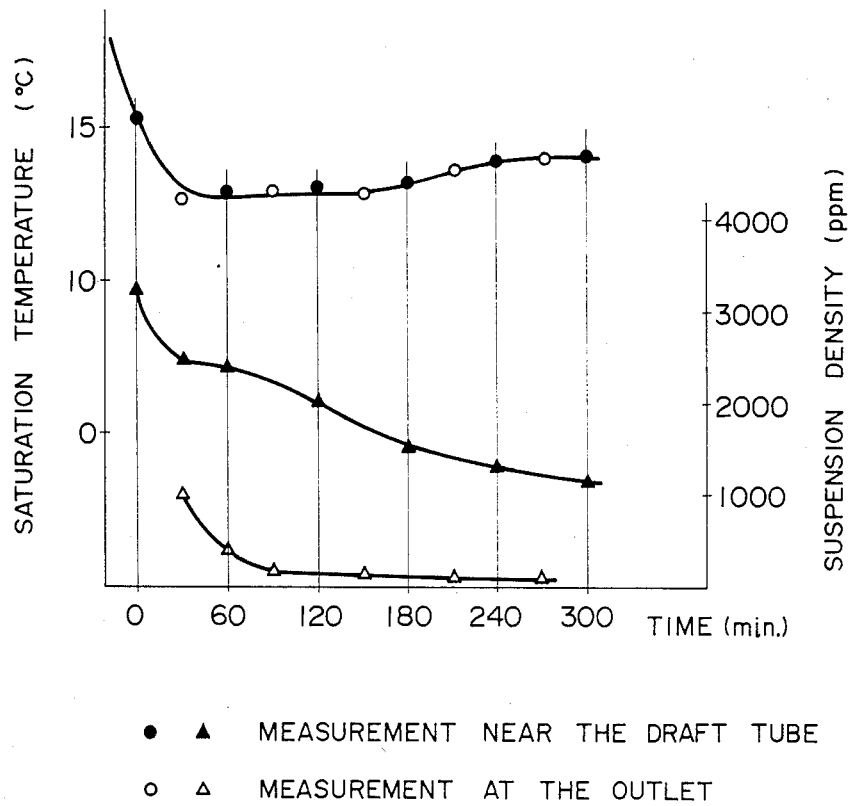
FIG. 2 is a graph which shows the results of an experiment conducted using the crystallizer of FIG. 1.

An experiment was conducted using a crystallizer as shown in FIG. 1. The conditions were: flow rate of white wine from the inlet 14 of 30 liters/hour; residence time of 1 hour; crystallization temperature of $-0.5°$ C.; stirring speed of 50 rpm; and an amount of seed crystal of 3200 ppm. The results are shown in FIG. 2. FIG. 2 reveals that suspension density near the draft tube plotted by ▮ was considerably different from that of the overflowing wine plotted by Δ; that a steady state was maintained in the crystallizer; and that product having a fixed concentration was continuously discharged owing to the steady state in the calming section.

CAVEAT

Obviously, numerous modifications and variations of the present invention are possible in light of the above teachings. It is therefore to be understood that, within the scope of the appended claims, the invention may be practiced otherwise than as specifically described herein.

We claim:

1. An apparatus for removing tartar from wine or grape juice, said apparatus comprising:
   (a) a closed cylindrical crystallizing vessel,
   (b) a draft tube open at its bottom and its top and positioned inside said cylindrical crystallizing vessel, said draft tube being centered in the bottom half of said cylindrical crystallizing vessel by supporting members mounted on said cylindrical crystallizing vessel, said draft tube and said cylindrical crystallizing vessel together defining an annular zone therebetween, said draft tube having a height of $\frac{1}{2}$ to $\frac{1}{4}$ the height of said cylindrical crystallizing vessel, the cross sectional area of said draft tube being smaller than the cross sectional area of the annular zone between said cylindrical crystallizing vessel and said draft tube;
   (c) a stirrer disposed within said draft tube, said stirrer being sized, shaped, and positioned to make a downward flow inside said draft tube during use of said apparatus;
   (d) a cooling jacket in thermal contact with the exterior of said cylindrical crystallizing vessel,
   (e) the section of said cylindrical crystallizing vessel above said draft tube defining a calming section; and
   (f) said cylindrical crystallizing vessel having an inlet at the bottom thereof and an outlet at the top thereof so as to overflow liquid in said claming section as fresh liquid is introduced through said inlet.

2. An apparatus according to claim 1 wherein said draft tube has a diameter of between $\frac{1}{2}$ and $\frac{1}{3}$ the diameter of said cylindrical crystallizing vessel.

3. An apparatus according to claim 1 wherein said stirrer comprises a first propeller arranged inside said draft tube.

4. An apparatus according to claim 3 wherein said stirrer further comprises a second propeller arranged in the bottom portion of said cylindrical crystallizing vessel beneath said draft tube, said second propeller being sized, shaped, and positioned to make liquid in the bottom portion of said cylindrical crystallizing vessel flow upwardly through the annular zone between said cylindrical crystallizing vessel and said draft tube.

5. An apparatus according to claim 1 wherein said vessel has a conical bottom portion.

6. An apparatus for removing tartar from wine or grape juice, said apparatus comprising:
   (a) a cylinder being closed at its bottom by a conical portion and at the top by a cap portion and having an axial inlet at the bottom of said conical portion and a radial outlet near the top of said cylinder;
   (b) a cooling jacket in thermal contact with the exterior of said cylinder;
   (c) a cylindrical draft tube open at its bottom and its top and positioned inside of said cylinder, said draft tube being coaxially mounted in the bottom portion of said cylinder, said draft tube having a height of between $\frac{1}{2}$ and $\frac{1}{4}$ the height of said cylinder and being positioned so as define cylindrical crystallization zone inside said cylindrical draft tube, an annular crystallization zone between the exterior of said draft tube and the interior of said cylinder, a first flow reversal zone above said cylindrical draft tube, a second flow reversal zone below said cylindrical draft tube, and a calming zone above said first flow reversal zone; and
   (d) a stirrer disposed within said draft tube, said stirrer being sized, shaped, and positioned so that, in use, it drives liquid downwardly through said cylindrical crystallization zone, through said second flow reversal zone, upwardly through said annular crystallization zone, and through said first flow reversal zone.

7. An apparatus as recited in claim 6 wherein the cross sectional area of said annular crystallization zone exceeds the cross sectional area of said cylindrical crystallization zone.

8. An apparatus as recited in claim 6 wherein said stirrer comprises a first propeller mounted inside said cylindrical draft tube.

9. An apparatus as recited in claim 8 wherein said stirrer comprises a second propeller mounted beneath said cylindrical draft tube adjacent said inlet.

10. An apparatus as recited in claim 6 wherein said stirrer comprises at least one propeller mounted beneath said cylindrical draft tube adjacent said inlet.

11. An apparatus for removing crystallizable material from a liquid, said apparatus comprising:
(a) a cylindrical vessel having an inlet at its bottom through which, in use, a source liquid is introduced and an overflow at its top through which, in use, a product liquid from which crystallizable material has been removed is discharged;
(b) a cooling jacket disposed around said cylindrical vessel;
(c) a draft tube open at its bottom and its top and positioned inside of said cylindrical vessel, said draft tube being mounted essentially coaxially in the lower section of said cylindrical vessel so that the upper section of said draft tube is located approximately half way between the bottom of said cylindrical vessel and said overflow, said draft tube having a height of one half to one fourth of the height of said cylindrical vessel and a cross sectional area less than the cross sectional area of an annular zone defined between the outer periphery of said draft tube and the inner periphery of said cylindrical vessel;
(d) a first propeller disposed in said draft tube, said first propeller being mounted on a stirrer shaft for synchronous rotation therewith and being arranged to cause the liquid in said draft tube to flow downwardly when said stirrer shaft is rotated; and
(e) a second propeller mounted on said stirrer shaft for synchronous rotation therewith, said second propeller being disposed below the bottom of said draft tube and being spaced therefrom, said second propeller being arranged to cause an upward flow of liquid through said annular zone when said stirrer shaft is rotated, said upward and downward flows interacting so that the flow of liquid descending through said draft tube curls and flows upwardly through said annular zone;

wherein:
(f) in use, crystal growth is promoted in a section of said cylindrical vessel occupied by said draft tube and in which said annular zone is located, crystals contained in the flow of liquid ascending up through said annular zone tending to be reintroduced into the flow of liquid descending through said draft tube; and
(g) the section of said cylindrical vessel above said draft tube defines a calming zone having an upper section, the depth of said calming zone being selected so that, in use, the upper section of said clamping zone is essentially free of disturbance by the flow of liquid through said annular zone and so that said upper section of said clamping zone is essentially free of crystalline material being circulated through said draft tube and through said annular zone.

12. An apparatus as recited in claim 8 wherein said stirrer further comprises a third propeller mounted inside said cylindrical draft tube.

* * * * *